United States Patent Office 3,503,154
Patented Mar. 31, 1970

3,503,154
APPARATUS FOR THE PRECISION MACHINING OF ANNULAR WORKPIECES
Thomas Joachim Schmidt, Munchingen-Kallenberg, Germany, assignor to Supfina, Wieck & Hentzen, Remscheid, Germany
Filed Jan. 6, 1967, Ser. No. 607,789
Claims priority, application Germany, Jan. 8, 1966, S 101,351
Int. Cl. B24b 33/02
U.S. Cl. 51—58                    15 Claims

ABSTRACT OF THE DISCLOSURE

Apparatus for precision machining circumferentially extending grooves in the periphery of annular or cylindrical workpieces, such as raceways for ball bearings, wherein the annular or cylindrical workpiece is rotated by a frictional drive and an arcuate cross section groove is machined in a periphery of the workpiece by a grinding or honing stone which is oscillated about the center of the circular arc of the groove cross section, including a rotating drive disk frictionally engaged with one or more annular or cylindrical workpieces, a stationary pressure guide which supports the workpiece at its outer circumference and with an end face of the workpiece being directed toward the axis of the drive disk, and a rotatable axially displaceable stop arranged concentrically to the workpiece axis and bearing against the radially inner face of the workpiece. The common axis of the rotatable stop and the workpiece extends parallel to a radius of the drive disk, but is offset from such a radius in the direction of rotation of the drive disk and by an amount sufficient to provide for a centrally directed motive component of the workpiece.

BACKGROUND OF THE INVENTION

The invention is directed to apparatus for precision machining arcuate cross section grooves extending circumferentially of a periphery of an annular or cylindrical workpiece which is rotated by a frictional drive and, more particularly, to an improved arrangement for properly positioning and supporting the workpiece during machining thereof, and having novel advantageous features as compared with known positioning and supporting arrangements.

In precision machining operations of the type mentioned, it would be logical to use a rotatable chuck gripping the external periphery of the workpiece at a plurality of points, to hold the workpiece during machining thereof. However, devices of this type are very expensive and require a good deal of space, in addition to which there is a possibility that the workpieces will be gripped obliquely unless the chucks are carefully cleaned. Additionally, loading and unloading requires a considerable expenditure of time.

Accordingly, more recent machining apparatus used for machining grooves in the periphery of annular or cylindrical workpieces involved the concept of rotating the workpieces by a frictional force. For example, there are known workpiece receivers wherein the workpiece is rotated by a magnetic follower and bears on pressure guides. By virtue of these pressure guides, the workpiece is completely centered axially. A disadvantage, however, resides in the magnetic follower which is highly susceptible to wear and whose energizing coil requires a great deal of space. For large plants having several magnetic followers, the electric power requirements are very considerable. Since each follower requires its own drive which is derived, for example, from a central power source, the power plant is quite complicated and consequently expensive. The end faces of ball bearing races of small dimensions, or those with lateral recesses to receive packing elements, are not sufficient to provide for a sufficiently extensive flow of magnetic flux to assure a positive entrainment of the workpiece to rotate with the follower. Incomplete entrainment results in pronounced roundness defects.

It has also been suggested to replace the magnetic follower by a disk-shape or bell-shape driver having the workpiece pressed against one end thereof by loading the other end face of the workpiece by pressure rollers acting in the direction of the driver, with the position of the workpiece being determined by at least two pressure guides. However, this is not a satisfactory solution of the total problem. Even though the drive and the centering are satisfactory, numerous construction difficulties are encountered in designing a charging device. A plant with several machining stations requires a mechanical expenditure which is just as great as in the case of a drive by magnetic followers, since a separate workpiece spindle is required for each machining section.

All of the devices mentioned above have the additional disadvantage that, since the magnetic followers or mechanically acting drivers are axially immovable, the center plane of the groove must always be at the same distance from the end face of the annular or cylindrical workpiece, which bears either on the follower or on the driver. This distance, however, is not always the same on premachined rings of the same size and width. Consequently, greater tolerances are permitted and these lead to so-called groove racking, which must be compensated by the honing tool which otherwise should remove only a very small amount of material. The end result is longer machining times and poor finished products.

It is also known to rotate the workpiece by two feed rolls rotating in the same direction, and with these feed rolls having contact engagement with the workpiece at a spacing smaller than the outer diameter of the workpiece. The latter is so positioned on the rolls that its axis extends parallel to the axes of the rolls, and the distance between the rolls is so selected that a visible entrainment by the contact pressure of the honing tool and of a pressure roller, in the respective case, is ensured. A disadvantage in an arrangement of this type is that the device for producing the oscillating movement of the honing tool must be arranged outside the feed rolls, so that the honing tool becomes relatively heavy and cannot be subjected to high oscillating frequencies. On a machine having several working stations, two drives would be required for each station, to drive the feed rolls. By using long feed rolls on which several workpieces are supported in spaced relation one behind the other and coaxially of the rolls and of themselves, several machining stations could be formed on which these workpieces are machined either simultaneously or, if a two-stage honing process is used, in a way such that they are moved individually or in groups from one station or group of stations to the next station or group of stations. The multiplication of working stations would require, however, in the case of the above-described workpiece drive, a high expenditure for automatic disengagement of the honing tools from their working position, and for the construction of the respective oscillating devices.

SUMMARY OF THE INVENTION

The present invention is directed to providing a machine of the above-described type and requiring only a single means, which is rotated, to impart to the workpieces at a plurality of working stations a rotary movement by friction and without the aid of electromagnetic forces. To this end, the apparatus of the present invention includes a rotating drive disk, a stationary pressure guide having supporting engagement with the outer periphery of the workpiece, with the end face of the workpiece facing the axis of the drive disk, and with the workpiece engaging the drive pulley opposite to the direction of rotation of the latter, and a rotatable, axially displaceable stop arranged concentrically of the workpiece axis. The common axis on the stop and the workpiece extends parallel to a radius of the drive disk but is displaced, relative to such radius, in the direction of rotation of the drive disk by an amount sufficient to produce a centrally directed motive component of the workpiece.

The apparatus of the present invention is particularly suitable for precision machining of the inner grooves of the outer races of ball bearings and the outer grooves of inner races of ball bearings.

Preferably, the apparatus includes a pressure roller which loads or biases the workpiece toward the drive disk, the direction of the force exerted by means of the pressure roller and on the workpiece being preferably so selected that it extends along a line intersecting the line extending between the point of contact between the workpiece and the drive disk and the bearing point of the workpiece on the stationary pressure guide. In this way, the workpiece is completely locked in a circumferential direction of the drive disk. It is secured against displacement in the direction of its axis on the one hand by the stop on the other hand by the fact that it tends, due to the above-mentioned motive component, to move in the direction of the center of the drive disk and thus to bear on the stop. The displaceability of the stop is necessary in order to align bearing races of different width so that the honing stone engages completely in the groove.

Displacement of the stop can be effected by a fluid pressure operated piston, the supply and discharge of the fluid pressure relative to this piston being preferably provided by control means, with the effect that the stop holding the workpiece in the suitable position for entrance of the honing stone into the groove is axially displaced by a small amount in the direction of the center of the drive disk after the honing stone has entered into the groove. In the case of groove racking, the workpiece can align itself toward the honing stone, since it is no longer hindered by a stop in its corresponding axial displacement. The workpiece is thus guided, throughout its travel, by the honing stone.

The importance of the workpiece driving and centering system embodying the invention resides mainly in the fact that it simplifies, to an optimum degree, the construction of machining apparatus with a plurality of machining stations, loading stations and unloading stations arranged in a circle around the drive disk. Furthermore, insofar as the workpiece, together with the elements for securing its position relative to the honing stones, consists of the pressure guides, rotary stops and pressure rollers, it can, if necessary, be moved simply from one station to another without disengagement from the drive disk.

To this end, and in accordance with another feature of the invention, there is provided a rotary holder extending coaxially of the drive disk and carrying these elements, a set of the elements being arranged on the holder at each station, and control means being provided which shift the holder, after the machining of the workpieces is completed on preceding stations, by an angular displacement in a manner such that the workpieces are fed to following stations.

The apparatus of the invention can also be designed to perform a two-state honing process, where the grooves of several workpieces first are roughed in at a first group of machining stations simultaneously by individual honing stones, and are subsequently finished in a second group of machining stations simultaneously by another group of respective honing stones. After this, the finished workpieces are fed to a group of loading and unloading stations, and the workpieces in the first group of machining stations are simultaneously advanced in to the second group for finishing. The same number of individual stations must be provided in each group.

Accordingly, the apparatus embodying the invention is so designed, for a two-stage process, that two groups of adjacent stations are provided. For example, each group of stations can simultaneously process three workpieces. The groups adjoin one another in a circle around the drive disk. A prerequisite is that, independent of the number of processing stages, the number of loading and unloading stations must correspond to the number of machining stations provided for each process stage.

Accordingly, an object of the present invention is to provide improved apparatus for precision machining circumferentially extending arcuate cross sectioned grooves in a periphery of an annular or cylindrical workpieces.

Another object of the invention is to provide such a precision machining apparatus including novel means for supporting the workpieces during machining thereof.

A further object of the invention is to provide such a precision machining apparatus including a rotatable drive disk frictionally rotating the workpieces.

BRIEF DESCRIPTION OF THE DRAWINGS

For an understanding of the principles of the invention, reference is made to the following description of typical embodiments thereof as illustrated in the accompanying drawings.

In the drawings:

FIG. 4 is an enlarged sectional view illustrating a detail;

FIG. 5 is a partial axial sectional view of a modified form of apparatus embodying the invention and used for machining the inner races of ball bearings; and FIG. 6 is an elevation view looking in the direction of the arrow A of FIG. 5.

DESCRIPTION OF THE PREFERRED EMBODIMENTS

Figure 1:
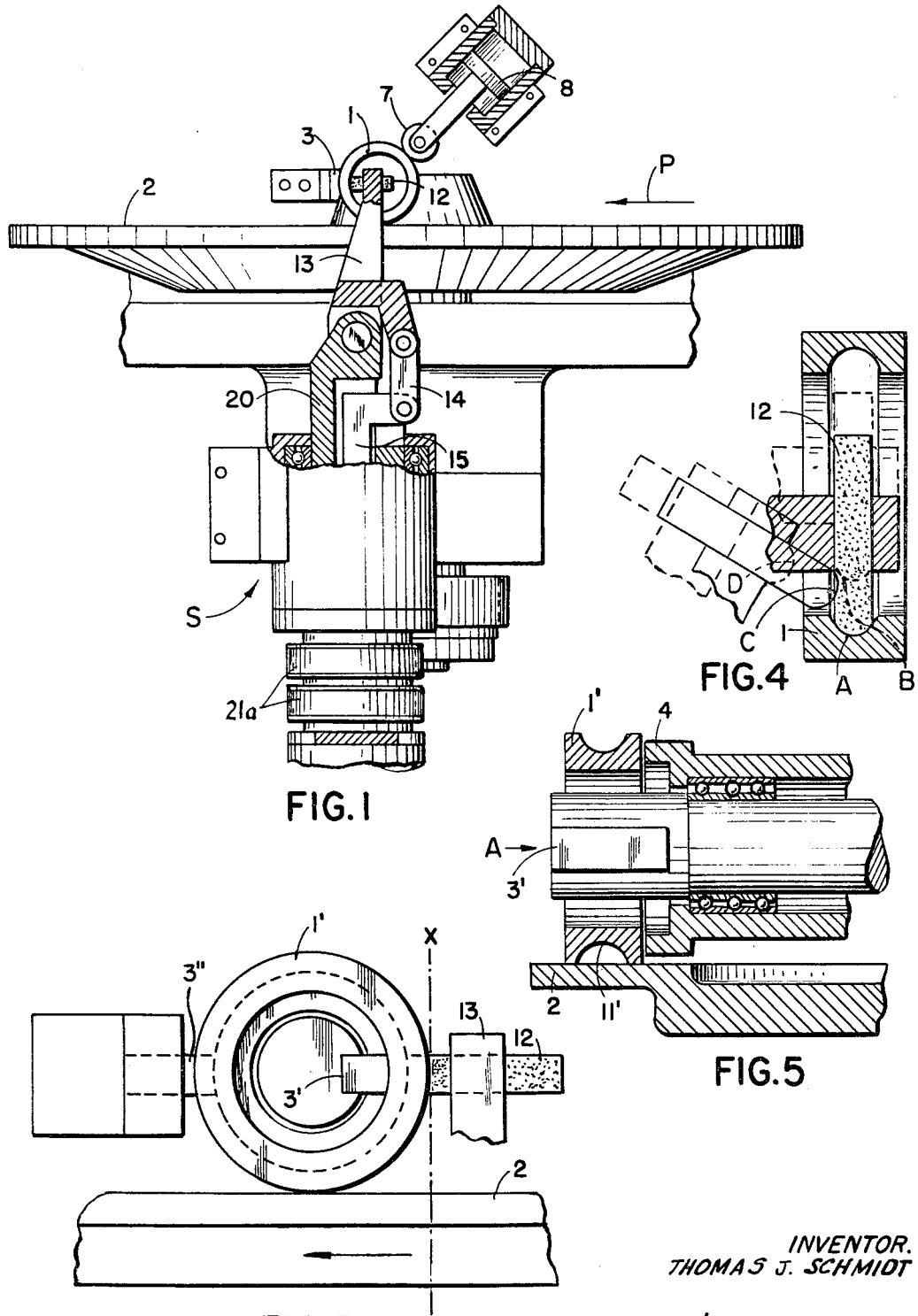
FIG. 1 is a side elevation view, partly in section, of one form of apparatus embodying the invention.
Figure 3:
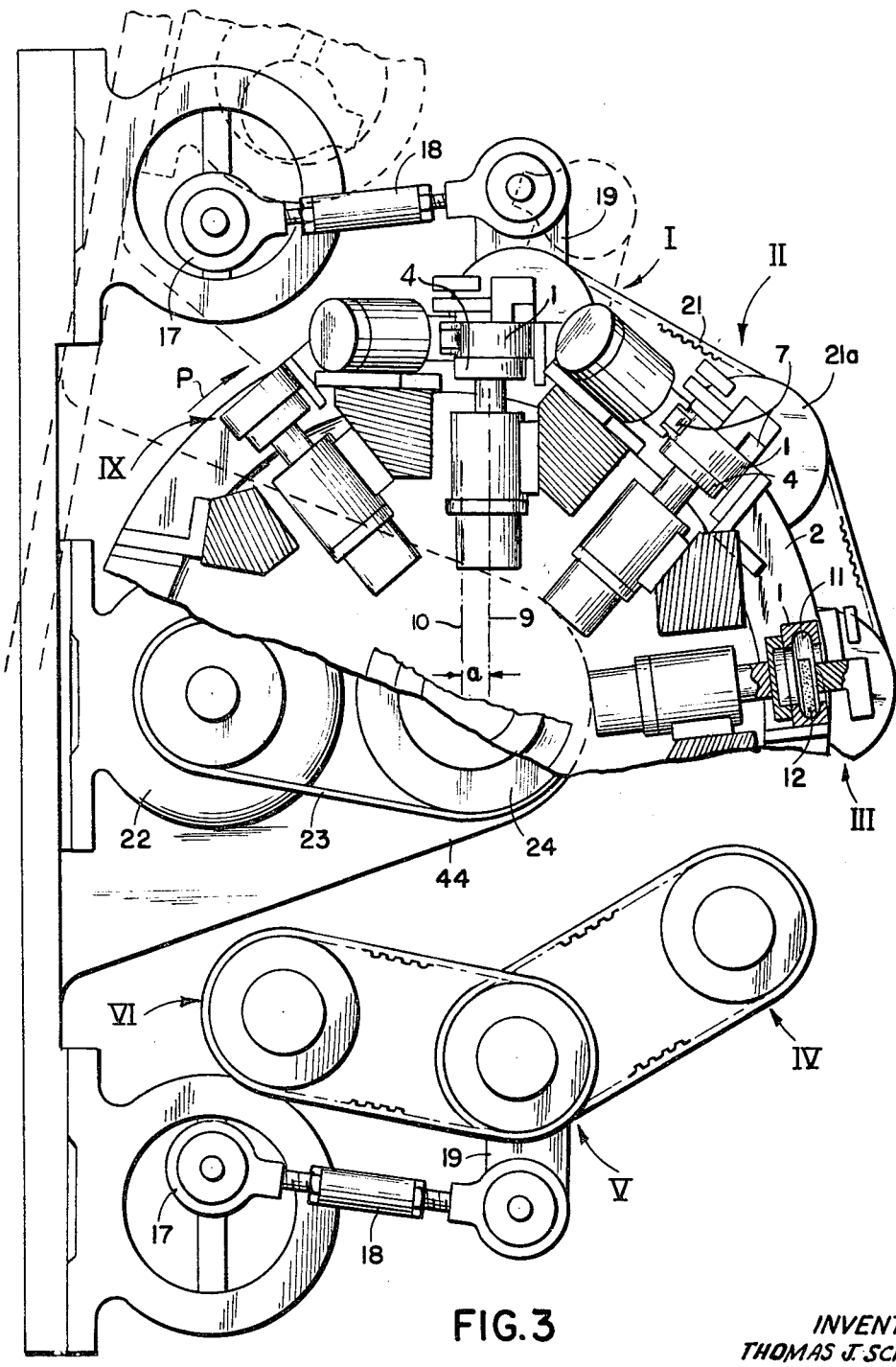
FIG. 3 is a partial plan view and partial horizontal sectional view taken along the line III—III of FIG. 2.

Referring first to FIG. 1, the workpiece to be machined is illustrated as the outer race of a ball bearing, and is indicated at 1. With respect to a rotating drive disk 2, workpiece 1, which is annular in the embodiment illustrated, is so positioned that one of its end faces is directed toward the axis of drive disk 2, and this end face is engaged by a rotatable and axially displaceable stop 4. Stop 4 is mounted in an anti-friction guide 5 and is coaxial with workpiece 1. The circumferential periphery of workpiece 1 is engaged by a pressure guide 3. Stop 4 can be displaced axially by pressure fluid operative on a piston 6 to which stop 4 is attached. A pressure roller 7, which is biased by a fluid pressure operated cylinder 8, urges workpiece 1 toward drive disk 2 and pressure guide 3. The support for the stop, the pressure guide and the pressure roller, together with its piston drive, will be described hereinafter. As best seen in FIG. 3, the common axis 9 of workpiece 1 and stop 4 extends parallel to a radius 10 of drive disk 2 but is displaced relative to the radius by an amount $a$ in the direction of rotation of disk 2 as indicated by arrow P. The result of this displacement is that a motive component acts on workpiece 1 in the direction of the drive disk axis, so that workpiece 1 tends to move axially inwardly while on drive disk 2 and thus to bear against stop 4.

A honing stone 12 engages in the groove 11 in the inner periphery of workpiece 1, and is biased by a rocking lever 13, on which stone 12 is mounted, toward the circular arcuate cross section bottom of the groove 11. The center of the circular arc of the groove cross section, which is at the shortest distance from the pressure guide 3 as seen in FIG. 1, lies in a plane perpendicular to the drawing plane of FIG. 2 and on the center axis of a rotary oscillator S. Oscillator S comprises a hollow shaft 20 which is supported in an upright framework 29, and which has a guide rod 15 extending axially thereof. The upper end of hollow shaft 20 is provided with a pivot pin about which rocking lever 13 oscillates at its end remote from honing stone 12. As best seen in FIG. 1, this remote end of lever 13 is interconnected with guide rod 15 by a toggle link 14.

Guide rod 15 can be displaced axially in both directions by a piston 16, so that honing stone 12 is either pressed on the bottom of groove 11 or is lifted from the bottom of the groove, depending on the direction of feed of pressure fluid to piston 16. Oscillating movement is imparted to hollow shaft 20 by a crank drive 17, having an adjustable eccentricity, and including a longitudinally adjustable crank rod 18 and a lever 19. Lever 19 has one end secured to hollow shaft 20 and its other end pivotally connected to crank rod 18.

In a machine having several machining stations, such as shown in FIG. 3, for example, stations I, II and III, the oscillating movement transmitted directly to the rotary oscillator S of station I through the crank drive can be transmitted to the rotary oscillators of stations II and III by means of geared belts 21. For this purpose, geared belt pulleys 21a are fixed on hollow shafts 20 of the rotary oscillator, with two such geared belt pulleys being required for station II while only a single geared belt pulley is required at each of stations I and III.

The machine shown in FIG. 3 is designed for a two-stage honing process. Roughing is effected on stations I to III, and finishing on stations IV to VI. Only the geared belt pulleys 21a of the rotary oscillators of stations IV to VI, together with the crank drives 17, 18, 19 for the rotary oscillator of station V, are shown in the drawing. In addition, three loading and unloading stations are provided, and are arranged upstream or ahead of machining station I considering the direction of rotation of drive disk 2. Disk 2 is driven by motor 22 thrugh belts 23 and a belt pulley 24.

The elements for positioning and mounting the workpieces on the drive disk, namely pressure guides 3, stops 4 and pressure rollers 7, with the latter together with their control pistons and cylinders, are duplicated nine times in the embodiment of the invention shown in FIG. 3, while the rotary oscillators S with their honing stones 12 are provided only six times, namely only for stations I to VI. These elements are arranged in the upper part of the machine on a holder 25 which is rotatably mounted in a housing 26 by means of a shaft 27. This housing is supported on several columns 28 attached to upright 29 of the framework, and it is adjustable in height.

In order to advance the workpieces to the next machining stage and to the loading and unloading stations, holder 25 may be angularly displaced through the medium of a worm wheel 30 and a worm 31, after retracting index 34 engaging index plate 32, this index being operable by a fluid pressure operated piston 33. In the new angular position of holder 25, index 34 is projected into the corresponding groove in the index plate to lock the holder 25 against rotation. At each machining stage, three outer races of ball bearings can be machined simultaneously.

In operation, workpieces are inserted at the three loading-unloading stations VII, VIII (not shown) and IX. Holder 25 is then turned through 120°, so that the workpieces arrive at machining stations I, II and III, where the honing stones have been swung out of range of the workpieces in a manner described more fully hereinafter. After the honing stones have been re-introduced into the grooves, the first machining stage, which is the "roughing" stage, is performed. While this stage is being performed, the work holders now at loading-unloading stations VII, VIII and IX can be charged with new workpieces. After the roughing has been completed, holder 25 is again turned through 120° which brings the rough finished workpieces at stations I, II and III to stations IV, V and VI where the finish machining is performed. At the same time, new workpieces are inserted in the work holders which have arrived at the loading-unloading stations VII, VIII, and IX, and the work pieces which have left the loading and unloading stations are subjected to a rough machining at stations I, II, and III. After a further turning of the work holder through 120°, the work pieces which have been finished at the stations IV, V, and VI have advanced to the loading-unloading stations VII, VIII, and IX, where they are removed and replaced by new workpieces. The cycle then repeats itself.

Of course, the machine can be designed for a single-stage honing process. In such case, three machining stations and three loading-unloading stations are provided distributed around the circumference of the machine. Six sets of work receiving elements, comprising the pressure guides 3, stops 4 and pressure rollers 7, are provided and three rotary oscillators are provided. During the cycle, holder 25 is turned 90° during each step. Correspondingly, the number of machining stations can be so provided that more or less than three workpieces can be machined simultaneously in each machining stage on machines designed to perform either single or two-stage honing processes.

Figure 2:
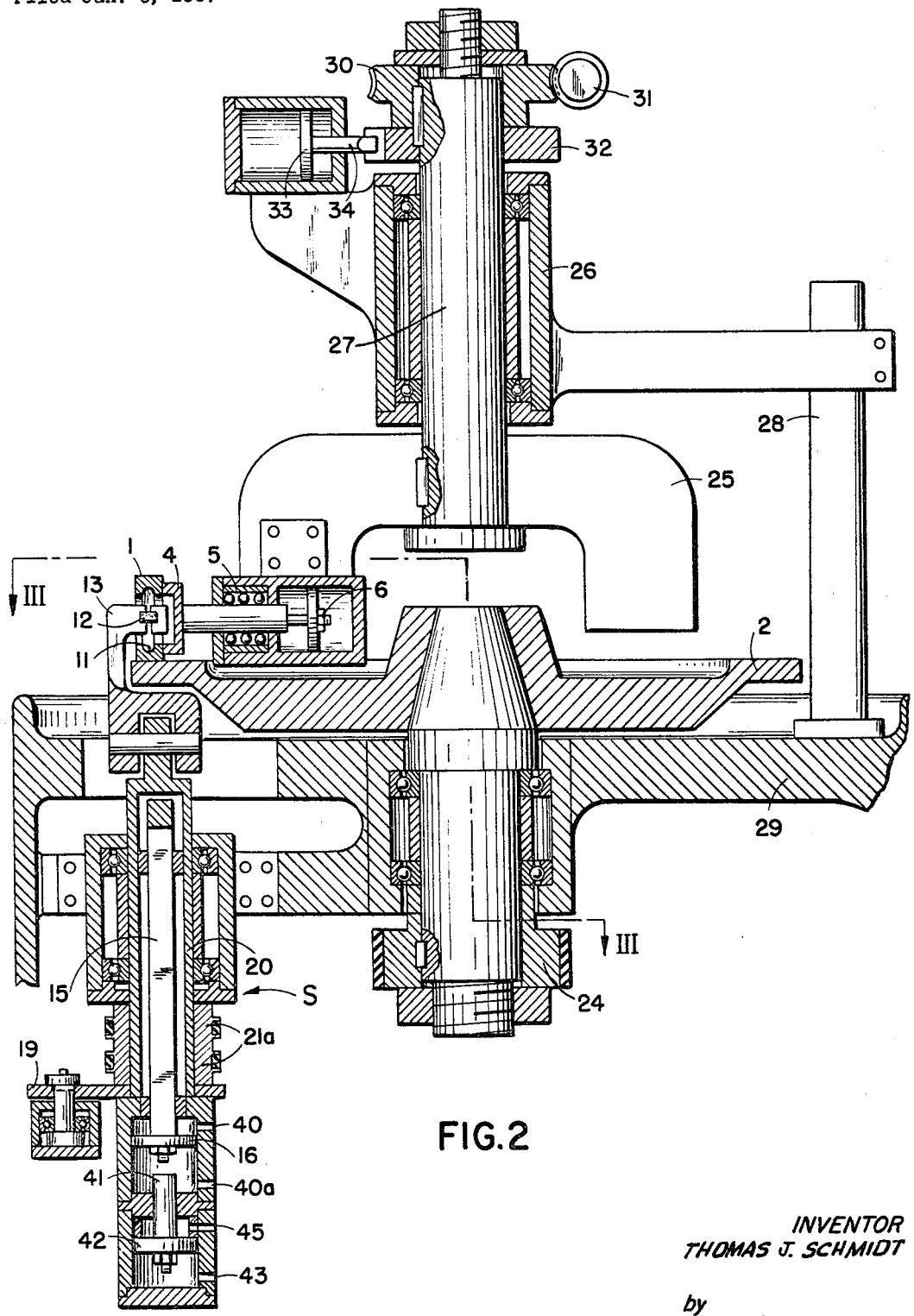
FIG. 2 is an axial sectional view through the apparatus shown in FIG. 1, the apparatus including a plurality of machining, loading, and unloading stations and with the workpiece positioning and rotating means being illustrated at only one station.

Honing stones 12 must be moved out of range of the workpieces while the workpieces are being moved from one group of stations to the next group and to the loading-unloading stations. This is effected in the manner which now will be described. Referring to FIG. 2, an axially positioned stop 41 projects into the cylinder housing the piston 16, and this stop forms the piston rod of another piston 42 slidable in another cylinder separated from the cylinder containing the piston 16. When pressure medium is admitted through opening 40 into the upper cylinder, and the opening 40a has been connected to an exhaust or return line, piston 16 is moved downwardly. During this downward movement, the lever 13 is turned clockwise, as viewed in FIG. 1, withdrawing honing stone 12 from groove 11. The honing stone 12 thus moves from the position A of FIG. 4 into the position B. However, piston 16 cannot complete its full stroke, since it engages stop 41 which arrests downward movement of piston 16. The control for the working fluid is so designed that the cylinder chamber on the side of piston 42 remote from stop 41 is, at this time, filled with working fluid and a feed line connected to port 43 is closed, so that piston 16 cannot push piston 42 downwardly.

Subsequently, however, honing stone 12 is turned from position B through 60°, for example, into position C (FIG. 4). Referring to FIG. 3, the two motors for effecting the oscillating movement of the rotary oscillators S in stations I, II, III and IV, V, VI are mounted on a rocker arm 44 which is rockable about the axis of drive disk 2. If rocker arm 44 is rocked clockwise, the rotary oscillator motor at the left in FIG. 3, the crank bar 18 and the lever 19 occupy the position represented by broken lines. The relative angular position of lever 19 before this movement is shown in solid lines, and its swung-out position (broken lines) is, for reasons of space, not shown to be as large a displacement as is actually selected in practice. The rotary oscillator motor for producing oscillations of the honing stones 12 in stations IV, V and VI is likewise moved clockwise into a position which has not been shown in the drawings for the sake of simplicity, the lever 19 connected with the rotary oscillator of station V being turned in the same direction. In this manner, all the honing stones at the machining stations attain the same position C as shown in FIG. 4.

When this has been effected, pressure medium is introduced through port 45 into the cylinder above piston 42, while pressure medium is withdrawn through port 43. During the downward movement of piston 42, stop 41 disengages piston 16 so that the latter can continue its movement to the end of its stroke if its cylinder is fed with pressure fluid. Consequently, the honing stones perform movements in the sense of continuing their initial lifting movements, and arrive in the position D of FIG. 4.

As can be seen from FIG. 3, each of the rotary oscillators, namely the rotary oscillator for stations I, II and III and the rotary oscillator for stations IV, V and VI is driven by a respective motor. This type of drive is necessary when the oscillating movement of honing stones 12 in the roughing operation is at a different frequency or amplitude than the oscillating movement of the honing stones 12 in the finish machining. The frequency depends on the motor speed and the amplitude on the pre-set eccentricity of the crank drive. Rocker arm 44 can be moved hydraulically by a piston drive, just like the other controllable elements of the workpiece receivers and of the rotary oscillators.

FIGS. 5 and 6 illustrate a modified form of the invention apparatus, suitable for machining workpieces where grooves are to be formed in the outer peripheries of the workpieces, as in the case of the inner races of ball bearings. Workpiece 1', which is here an inner race of a ball bearing, rolls on drive disk 2. Its outer peripheral groove is engaged by honing stone 12 to machine the groove bottom 11'. In the same manner as previously described, honing stone 12 is inserted into honing stone holder 13 and is oscillated about the center axis $x$—$x$ of the rocker arm, as shown in FIG. 6.

Either one of two arrangements can be used to fixedly position the workpiece or inner race 1' against axial displacement. For inner races having center bores with a relatively large inside diameter, it is expedient to use a design where the stop 4 can rotate about a fixed axle. The forward portion of this axle passes through the central bore of the inner race, and carries the pressure guide 3' which bears against the periphery of the center bore on that side opposite the honing stone 12. The carrier of pressure guide 3', engaging the workpiece, can be positioned adjacent an end face of the workpiece opposite the stop 4 and be secured to the holder 25 (FIG. 2), but the illustrated arrangement has been found to be particularly advantageous as no fastening point on holder 25 is required for holding pressure guide 3'. For smaller diameter inner races of ball bearings, the dimensions of the central bore are too small to introduce a pressure guide having the dimensions requisite for good stability. In this case, it is advisable to use the pressure guide 3" (FIG. 6) which engages the groove from the exterior of the workpiece 1' but on the side opposite the point of engagement with the honing stone 12. In this case, it is essential that the carrier of the pressure guide 3" be secured to holder 25. Pressure rollers for biasing the workpiece toward drive disk 2 can also be provided in the embodiment of the invention shown in FIGS. 5 and 6.

In all of the described embodiments, the pressure guides can be so designed that they can be displaced in the direction of that face of the workpiece on which they bear, and then be locked in the adjusted position. Since such an adjusting device is easily designed, it has not been illustrated in the drawings. Furthermore, the hydraulic control means mentioned above have not been explained in detail, since their design and operation will be apparent to those skilled in the art.

What is claimed is:

1. In apparatus for precision machining arcuate cross section, circumferentially extending grooves in the peripheries of circular cross section workpieces, such as ball bearing races, and wherein the workpiece is rotated by a frictional drive while being machined by a honing stone oscillating about the center of the circular arc groove cross section: the improvement comprising, in combination, a frame; a drive disk rotatably mounted on said frame for frictionally rotating the workpiece; a stationary pressure guide mounted on said frame and engaging the outer periphery of the workpiece, having its outer periphery rotating on said drive disk and an end surface facing the axis of said drive disk, said stationary pressure guide engaging the workpiece periphery on the side leading in the direction of rotation of said drive disk; and a rotatable stop mounted on said frame for axial displacement and coaxial with the workpiece axis, and engaging that end surface of the workpiece facing the axis of said drive disk; the common axis of the workpiece and said rotatable stop extending parallel to a radial and axial plane of said drive disk but spaced from such plane in the direction of rotation of said drive disk by a distance sufficient to produce a motive component of the workpiece directed toward the center of said drive disk.

2. Apparatus, as claimed in claim 1, including a pressure roller mounted on said frame and loading the workpiece in the direction of said drive disk.

3. Apparatus, as claimed in claim 2, in which the direction of the loading exerted by said pressure roller is such as to produce one force component acting in the direction of the drive disk and a second force component acting in the direction of said stationary pressure guide.

4. Apparatus, as claimed in claim 1, in which said rotatable stop is mounted on the outer end of a piston rod connected to a piston displaceable in a cylinder by fluid pressure.

5. Apparatus, as claimed in claim 1, and wherein the honing stone is pressed into the workpiece groove and retracted from the workpiece groove by fluid pressure operated piston and cylinder means, and including means for oscillating the honing stone relative to the arcuate cross section of the workpiece groove; said oscillating means including a tubular column; a honing stone holder secured to said column; a relatively elongated guide rod extending axially of said column and connected to said holder, said guide rod being displaceable axially of said holder; said piston and cylinder means comprising a cylinder coaxial with said column and a piston in said cylinder and connected to said guide rod.

6. Apparatus, as claimed in claim 5, including control means effecting operation of said piston and cylinder means to initially displace the honing stone diametrically of the workpiece to retract the honing stone from the workpiece groove; said control means then effecting an oscillation of said tubular column to swing the honing stone about the axis of said tubular column to partially retract said honing stone from the workpiece; said control means thereafter operating said piston and cylinder means to fully retract said honing stone from the workpiece.

7. Apparatus, as claimed in claim 4, including control means controlling flow of pressure fluid to said cylinder and operable, after the honing stone is inserted into the workpiece groove, to displace said rotatable stop a slight amount in the direction of the axis of said drive disk.

8. Apparatus, as claimed in claim 1, including a plurality of machining stations and loading-unloading stations arranged in a circle centered on said drive disk.

9. Apparatus, as ciamed in claim 8, in which said frame includes a rotary holder coaxial with said drive disk and supporting a pressure guide and a rotatable stop at each of said stations; and control means operable to angularly displace said holder at the end of a machining operation at one station to move the workpiece just machined at said one station to a following station, in a repetitive cycle.

10. Apparatus, as claimed in claim 9, including a pressure roller at each station loading the workpiece thereat in the direction of said drive disk.

11. Apparatus, as claimed in claim 9, and operable to effect a two-stage honing operation, said machining stations being arranged in two groups each including plural stations, the two groups being arranged in succession around such circle; the first group of stations providing for ismultaneously rough machining plural workpieces, one at each station of the first group, and the second group of stations providing for finish machining of the same number of workpieces, one at each station of the second group, the machining operations at the two groups of stations being effected simultaneously.

12. Apparatus, as claimed in claim 11, in which said stations include a group of loading-unloading stations equal in number to the number of stations in each of said groups of machining stations; said loading-unloading stations preceding said first group of machining stations.

13. Apparatus, as claimed in claim 1, for precision machining grooves in the exterior peripheries of inner races of ball bearings; said pressure guide bearing against the inner periphery of the race in radial alignment with the honing stone engaged in the groove in the outer periphery of the workpiece.

14. Apparatus, as claimed in claim 13, in which the axle of said rotatable stop extends into the workpiece; said stop being rotatable on its axle; said pressure guide being mounted on the end of said axle extending into the workpiece.

15. Apparatus, as claimed in claim 1, for the precision machining of grooves in the external peripheries of the inner races of ball bearings; said pressure guides engaging the workpiece groove diametrically opposite the point of engagement of the honing stone with the workpiece groove.

References Cited

UNITED STATES PATENTS

| | | | |
|---|---|---|---|
| 2,039,223 | 4/1936 | Hutchinson | 51—48 X |
| 2,646,652 | 7/1953 | Blood | 51—236 X |
| 3,345,783 | 10/1967 | Militzer | 51—58 |

LESTER M. SWINGLE, Primary Examiner

U.S. Cl. X.R.

51—236, 291